United States Patent [19]

Mönch

[11] Patent Number: 5,127,110

[45] Date of Patent: Jul. 7, 1992

[54] SANITARY FAUCET FOR SURFACE ATTACHMENT

[75] Inventor: Heinrich Mönch, Kenn, Fed. Rep. of Germany

[73] Assignee: Ideal-Standarad GmbH, Bonn, Fed. Rep. of Germany

[21] Appl. No.: 585,134

[22] PCT Filed: Jan. 31, 1990

[86] PCT No.: PCT/EP90/00172

§ 371 Date: Nov. 30, 1990

§ 102(e) Date: Nov. 30, 1990

[87] PCT Pub. No.: WO90/08858

PCT Pub. Date: Aug. 9, 1990

[30] Foreign Application Priority Data

Jan. 31, 1989 [DE] Fed. Rep. of Germany ....... 3902799

[51] Int. Cl.⁵ ................................................ E03C 1/04
[52] U.S. Cl. ........................................ 4/696; 137/801; 228/154; 228/253
[58] Field of Search ............... 4/192; 137/801; 29/890, 29/141; 228/154, 253, 255

[56] References Cited

U.S. PATENT DOCUMENTS 4,289,339  9/1981  Hansen ................................ 285/305

FOREIGN PATENT DOCUMENTS

| | | |
|---|---|---|
| 0213423 | 3/1987 | European Pat. Off. . |
| 2401582 | 7/1974 | Fed. Rep. of Germany . |
| 2915391 | 10/1980 | Fed. Rep. of Germany . |
| 3509295 | 9/1986 | Fed. Rep. of Germany . |
| 3610367 | 1/1987 | Fed. Rep. of Germany . |
| 8711927 | 10/1987 | Fed. Rep. of Germany . |
| 3726436 | 2/1988 | Fed. Rep. of Germany . |

Primary Examiner—Charles E. Phillips
Attorney, Agent, or Firm—Sixbey, Friedman, Leedom & Ferguson

[57] ABSTRACT

A domestic plumbing installation of a generally simple design which is easy to manufacture, is obtained in the following manner: a connecting end of the water-conduit element is merely pushed into a connection-receiving part and includes at least one locking notch, which extends generally perpendicularly to the direction of insertion, preferably approximately tangentially, the valve housing includes at least one locking bore extending generally perpendicularly to the direction of insertion preferably approximately tangentially to the connection-receiving part and ending in the connection-receiving part. To this end the locking notch is aligned with the locking bore; a locking pin preferably a tangential pin of solder material can be inserted into the locking bore and further into the locking notch for temporary assembly, when the tangential pin is inserted the water-conduit element is permanently secured to the valve housing by causing the solder material to melt.

6 Claims, 2 Drawing Sheets

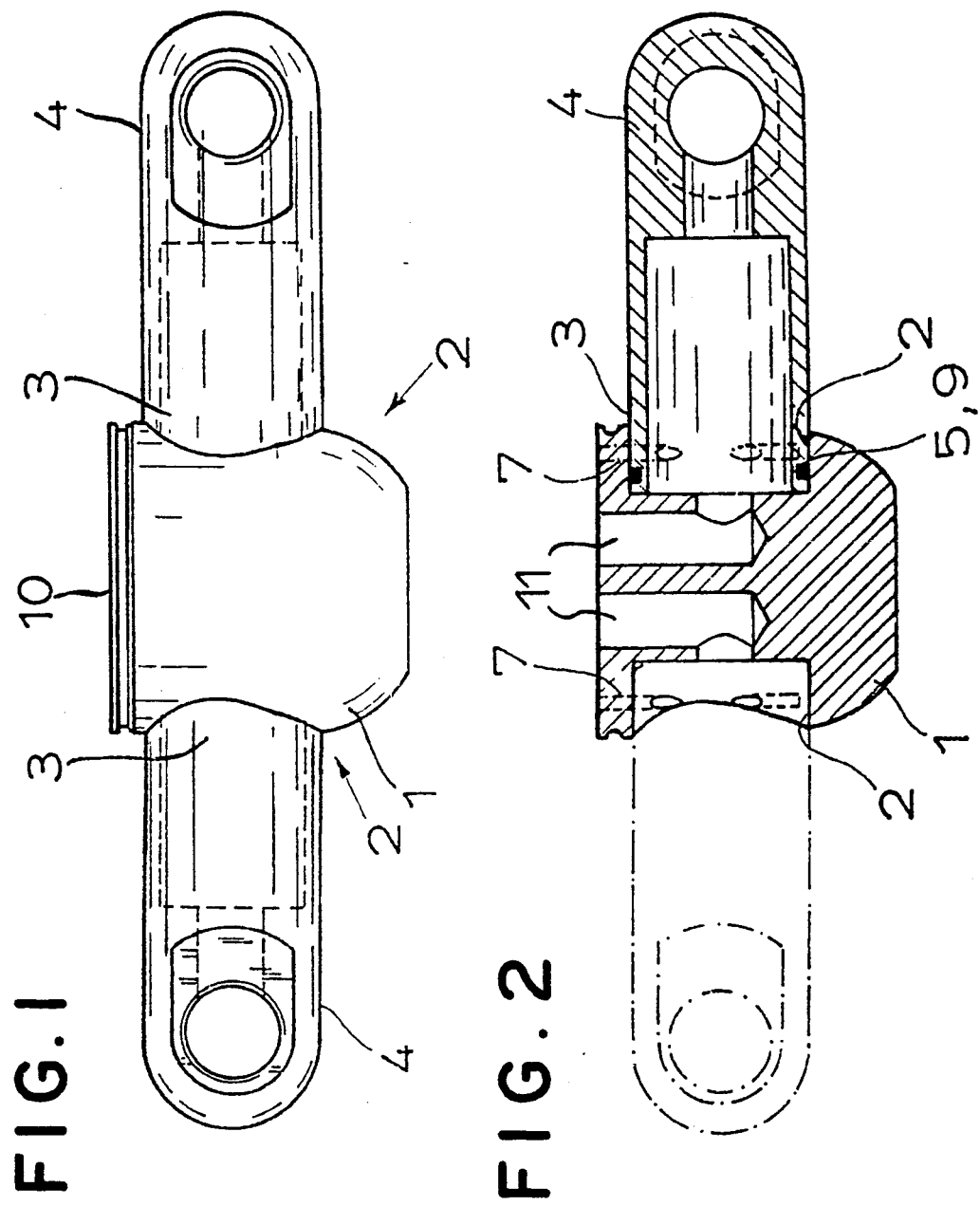

SANITARY FAUCET FOR SURFACE ATTACHMENT

The invention relates to a sanitary faucet for surface attachment with a valve housing with at least one ring-shaped preferably circular ring-shaped connection mounting and with a water pipe section inserted with a connection end into the connection mounting, and the water pipe section in the connection mounting is sealed toward the valve housing by a seal and is rigidly connected to the valve housing.

BACKGROUND OF THE INVENTION

Sanitary faucets for surface attachment are known in a multiplicity of embodiments as bath faucets, spray faucets, sink faucets, bidet faucets etc. Such a sanitary faucet normally has a valve housing in which, with modern sanitary faucets, a single-lever mixing system is usually placed. To feed warm and cold water and to draw mixed water, such a valve housing usually has several connection mountings, into which connection ends of corresponding water pipe sections can be inserted. This is performed nowadays usually by having the valve housing in the connection mounting exhibit an inner thread into which the connection end of the water pipe section provided with a corresponding outer thread can be screwed. The seal is made as a pressure-stressed sealing ring in a way known in sanitary plumbing engineering.

The above-explained screw connections provided in previously known sanitary faucets of the type in question use much material because the wall thickness of the valve housing and of the water pipe sections must permit applying the threads. Further, the production technique is expensive with the requirement of cutting corresponding threads, etc.

SUMMARY OF THE INVENTION

The object of the invention is to indicate a sanitary faucet of the type in question that overall is made, and can be produced, more simply.

The object indicated above is achieved according to the teaching of the invention in that the water pipe section is only inserted with its connection end into the connection mounting and exhibits on the connection end at least one locking notch running essentially perpendicular to the insertion direction, preferably approximately tangential, in that in the valve housing there is provided at least one locking bore running essentially perpendicular to the insertion direction, preferably approximately tangential to the connection mounting, and leading into the connection mounting, in that when the locking notch and the locking bore are aligned, a locking pin, preferably a tangent pin can be inserted into the locking bore and further into the locking notch and in that, when the tangent pin is inserted, the water pipe section is rigidly connected to the valve housing. The essential core of the teaching of the invention is dispensing with a screw connection at the indicated points. Instead, a pin connection is made, which is considerably simpler in terms of production and is more cost effective. Relative to the material wall thicknesses, it is also more advantageous than a screw connection. Normally, a single locking pin suffices; but if greater operational stresses are expected, several locking pins placed distributed on the periphery of the connection mounting can be inserted. Depending on the configuration of the flow channel in the water pipe section, there are various arrangement possibilities for the locking pin. It can be made, for example, as a transverse pin, i.e., run transversely through the water pipe section. That is especially suitable with respect to attachment and to durability, but is unfavorable with respect to flow. Consequently, it is especially advisable to make the locking pin as a tangent pin and to orient the locking notch and the locking bore correspondingly.

Other preferred features include the fact that the locking pin, preferably made as a tangent pin, is made as a soldering pin and thus the connection end is rigidly connected to the valve housing by an interior brazing connection. The tangent pin here is used only temporarily mechanically to connect the connection end of the water pipe section to the valve housing. The actual operational, mechanical connection is made by brazing performed after inserting the tangent pin, and the soldering material of the tangent pin penetrates into the gap between the connection end and the connection mounting and, on the one hand, produces a mechanically rigid, on the other hand directly also a hydraulically tight connection. A separate sealing element can even be dispensed with here.

The invention is explained in more detail below on the basis of a drawing representing only one embodiment. In the drawing there are shown in:

BRIEF DESCRIPTION OF THE DRAWINGS

FIG. 1 is a view of an embodiment of a sanitary faucet according to the invention showing only the valve housing and two water pipe sections, FIG. 2 is a cross-section view of the faucet of FIG. 1 in which a one water pipe sections is represented only in dot-dash lines.

DETAILED DESCRIPTION OF THE PREFERRED EMBODIMENT

Figure 3:
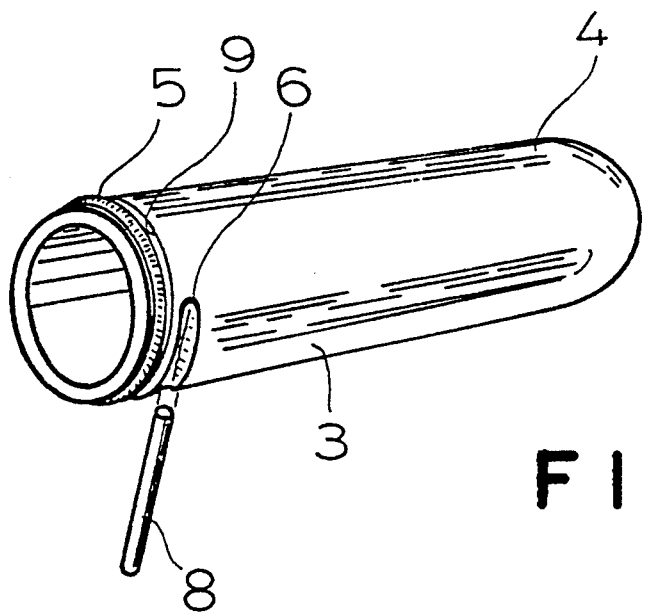
FIG. 3 is and exploded perspective view of a water pipe section and a locking pin for a sanitary faucet according to FIG. 1, with the locking shown in an enlarged detail as well

The sanitary faucet represented in FIG. 1 is intended for surface attachment and exhibits a valve housing 1 with at least an annular, preferably circular ring-shaped connection mounting 2. In the embodiment represented, several connection mountings 2 are provided. A water pipe section 4 is inserted with a connection end 3 into connection mounting 2. In the embodiment represented, two water pipe sections 4 are inserted, namely two water pipe sections 4, namely two water feed sections. As is indicated in FIG. 1 only at one water pipe section 4, water pipe section 4 is sealed in connection mounting 2 by a seal toward valve housing 1 and is further rigidly connected with valve housing 1.

Now it is essential that water pipe section 4 not be connected by a screw connection to valve housing 1 but rather that water pipe section 4 only be inserted with its connection end 3 into connection mounting 2 and that it exhibit, on connection end 3, at least one locking notch 6 running essentially perpendicular to the insertion direction, preferably approximately tangentially, that in valve housing 1 there is provided at least one locking bore 7 running essentially perpendicular to the insertion direction, preferably approximately tangentially to connection mounting 2 and leading from above and below into connection mounting 2, that when locking notch 6 is aligned with locking bore 7, a locking pin, preferably a tangent pin 8, can be inserted into locking bore 7 and further into locking notch 6 and that, when tangent pin 8 is inserted, water pipe section 4 is rigidly connected to valve housing 1. FIG. 3 shows, in a perspective representation, connection end 3 of corresponding water pipe section 4 and here especially clearly recognizably locking notch 6, which runs tangentially and transversely to the insertion direction. Here tangent pin 8 is also represented. Because of its position in locking notch 6, tangent pin 8 prevents connection end 3 of water pipe section 4 from being pulled out of connection mounting 2, not represented in FIG. 3. Here seal 5 seals connection end 3 in connection mounting 2 in a way relating to flow. FIG. 1 shows additionally how this connection end 3 now sits in connection mounting 2 and is fixed in the latter by tangent pin 8.

Moreover, reference is made to the general part of the description in which the way this construction functions has been described. There it has also been pointed out that the embodiment with a tangent pin 8 is only a preferred embodiment, but that further also transverse pins or the like could be used. Further it is also true that a use of several locking notches, locking bores and tangent pins per connection mounting can be suitable for reasons relating to attachment.

With respect to the embodiment of the locking pin, which is made here in a preferred way as tangent pin 8, there are various possibilities. Thus, there are cylindrical pins, tapered pins, grooved pins (see detail FIG. 3), etc. Here the embodiment as a grooved pin is especially suitable, by which a sliding out of locking bore 7 and of locking notch 6 can easily be prevented.

FIG. 3 shows, in connection with FIG. 2 that, for water pipe section 4 placed on the right there, seal 5 is made as a sealing ring placed in a circumferential lining groove 9 on connection end 3 and coming to lie tightly on the wall of connection mounting 2. For reasons relating to sealing, linking groove 9 here is located on the side of locking notch 6 facing the exposed end of discharge end 3. In this way, locking notch 6 lies outside the area in valve housing 1 that is to be sealed for reasons relating to flow.

In the general part of the description it has already been explained that the locking pin preferably made as tangent pin 8 can be made as a terminal pin, and in this way a different kind of connection technique results. This is realized in water pipe section 4 represented on the right in FIGS. 1 and 2. Tangent pin 8 not drawn in here is first inserted here as explained above, but then a brazing operation is performed, by which then a brazing connection is produced between connection end 3 of water pipe 4 and valve housing 1.

Figure 4:
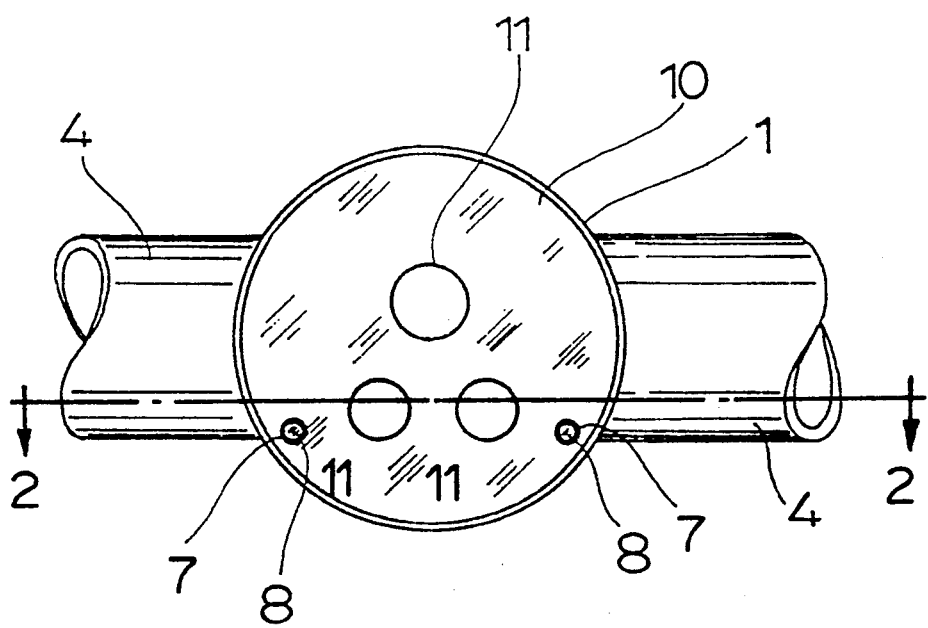
FIG. 4 shows a portion of the sanitary faucet of FIG. 1 in a view from the back side of the valve housing.

FIG. 4 clearly shows another configuration of the invention that is characterized in that valve housing 1 exhibits a flange facing 10 with other bores 11 for the passage of water and in that locking bore 7 originates at flange facing 10 and, preferably, runs parallel to bores 11 for the passage of water. In this way, the open end of locking bore 7 is located at a flange facing 10 that is covered in use and it is made possible, by structural requirement, that locking bore 7 is installed in one work step together with bores 11 for the passage of water.

It has already been generally pointed out above that several locking notches, locking bores and locking pins can be used. It may be especially suitable that, for each water pipe section, another locking notch or locking bore be placed on the opposite side of the water pipe section and of the connection mounting and that another locking pin made preferably as a tangent pin be provided. These parts of the sanitary faucet according to the invention, placed essentially parallel to one another, make it possible for the connection to be very strong with hardly greater connection expense.

From a production engineering viewpoint, a sanitary faucet according to the invention can be made especially suitably by first preboring the locking bore, next inserting the connection end of the water pipe section into the connection mounting and adjusting it therein and then boring the locking bore in the valve housing and simultaneously boring also the locking notch in the connection end. Obviously with this process technique the work step of applying the locking notch is eliminated for each water pipe section.

Finally, it has already been pointed out in connection with the explanation of FIG. 4 that the arrangement of locking bore 7 addressed there and represented in the drawing leads to locking bore 7 being able to be bored during processing at the same time as bores 11 for the passage of water. This advantageous process measure is independent of the overall advantageous production process explained above.

I claim:

1. A sanitary faucet for surface attachment with a valve housing having at least one annular connection mounting for receiving a water pipe section, a connection end of the water pipe section being inserted into the connection mounting of the valve housing, the connection end of water pipe section having at least one locking notch and a locking element, the connection mounting of the valve housing having a locking bore in flush alignment with the locking notch, said locking element is engageable in the locking bore and locking notch, and the locking element, when engaged, connecting the valve housing with the water pipe section; wherein the locking bore and locking notch run tangentially relative to the water pipe section; and wherein the locking element is made from soldering material so that the valve housing is temporarily mechanically connected to the connection end of the water pipe section by the locking element and then converted into a permanent connection by an interior brazing connection formed by the soldering material being caused to flow into a gap between the connection end of the water pipe section and the connection mounting of the housing by brazing thereof.

2. Sanitary faucet according to claim 1, wherein the valve housing has a connection facing which is covered in use and from which at least one additional water passage bore runs to each connection mounting; wherein the locking bore opens through the connection facing; wherein the locking bore and locking notch run tangentially with respect to the water pipe section; and wherein the locking element is a tangent pin.

3. Sanitary faucet according to claim 2, wherein the locking bore runs parallel to said water passage bores in the connection facing of valve housing.

4. Sanitary faucet according to claim 2, wherein a second locking bore and a second locking notch are placed on an opposite side of the connection mounting of the valve housing and of the connection end of the water pipe section respectively, and in which a second locking element is provided.

5. Sanitary faucet according to claim 2, wherein the water pipe section is sealed relative to the valve housing within the connection mounting by a sealing ring which is disposed in a circumferential groove on the connection end of the water pipe section which lies tightly against a wall of connection mounting of the valve housing.

6. Sanitary faucet according to claim 5, wherein the circumferential groove is located between the locking notch and an inner end of the connection end of the water pipe section.

* * * * *